3,048,639
PROCESS FOR STABILIZING CHLOROPRENE
Wilhelm Vogt, Knapsack, near Koln, Klaus Gehrmann, Efferen, near Koln, and Kurt Sennewald, Knapsack, near Koln, Germany, assignors to Knapsack-Griesheim Aktiengesellschaft, Knapsack, near Koln, Germany, a corporation of Germany
No Drawing. Filed Dec. 20, 1960, Ser. No. 77,029
Claims priority, application Germany Dec. 23, 1959
10 Claims. (Cl. 260—652.5)

The present invention relates to a process for stabilizing chloroprene, against α-polymerization and, simultaneously and particularly, against ω-polymerization.

It is known that two different kinds of polymers may form from monomeric chloroprene, in particular under the action of elevated temperatures. One of these polymers is the α-polymer which in most cases is completely soluble in monomeric chloroprene. The other polymer is the ω-polymer which grows by forming crumbly masses. The formation of these two types of polymers probably proceeds according to different mechanisms of polymerization. This supposition is confirmed by the fact that different polymerization inhibitors are used for the prevention of the two kinds of polymerization. Whereas numerous known inhibitors such, for example, as hydroquinone, phenothiazine and phenyl-β-naphthylamine are highly satisfactory for preventing α-polymerization, only very few substances are known for reliably preventing ω-polymerization. The substances used as inhibitors are principally oxides of nitrogen or nitro or nitroso compounds which, however, partially react with chloroprene and monovinyl acetylene to form explosive compounds, so that their use is not safe.

It has now been found that phenothiazine, which is a known and good α-inhibitor, is also very suitable for use in preventing the ω-polymerization of chloroprene if air is simultaneously blown into those parts of, for example, a distillation device in which chloroprene is stabilized with phenothiazine. This fact is all the more surprising since in the absence of an additional inhibitor, air has the effect of promoting polymerization.

The object of the invention is a process for stabilizing chloroprene against α-polymerization and at the same time against ω-polymerization by simultaneously adding phenothiazine and air or oxygen to the chloroprene. The phenothiazine is suitably added in the form of a solution, the chloroprene itself being in particular used as solvent. The air or oxygen is added in the gaseous state.

Phenothiazine exhibits the same stabilizing effect in the presence of air or oxygen when the chloroprene contains monovinyl acetylene.

According to the process of the present invention for simultaneously stabilizing chloroprene against α-polymerization and against ω-polymerization the chloroprene to which phenothiazine has been added in known manner is stabilized by blowing in air and/or oxygen. In the operations which are carried out in the process of preparing and purifying chloroprene, in particular in the distillation stages, the chloroprene to which phenothiazine has been added can be stabilized by blowing air and/or oxygen into it. In general about 1 to about 5% by volume, calculated on the quantities of phenothiazine-containing chloroprene vapour which pass through the distillation device, of air and/or oxygen are used. For example, 2 to 15 liters of air are introduced into the stills of the distillation columns per 1000 grams of refluent chloroprene containing phenothiazine, the content of phenothiazine being about 0.3 to about 1.0 part by weight per 100 parts by weight of chloroprene. It is, however, also possible to add a larger quantity, for example, a quantity amounting to up to some percentages, of phenothiazine to the chloroprene, although this is not necessary.

The phenothiazine that is added is advantageously dissolved in an inert solvent, for example, in the chloroprene itself.

Mixtures of chloroprene and monovinyl acetylene can also be stabilized by the process according to the invention.

The following examples serve to illustrate the invention but they are not intended to limit it thereto, the parts being by weight.

*Example 1*

(Known method)

A solution of phenothiazine in chloroprene was introduced at the top of a distillation column which was contaminated with germs of freshly prepared ω-polymer. The chloroprene was distilled under reflux and the aforesaid solution of phenothiazine in chloroprene was introduced into the column in such a quantity that 1000 parts of refluent chloroprene contained 0.5 part of phenothiazine. The distillation was carried out under atmospheric pressure with the exclusion of air and oxygen. After 24 hours the colourless germs of ω-polymer which had been introduced into the distillation column before the distillation began to grow without changing their colour. After 36 hours they rendered the distillation column inoperable by clogging it.

*Example 2*

(Known method)

This experiment was carried out in a distillation column analogous to that used in Example 1. Phenothiazine was introduced in such a quantity into the column that 1000 parts of refluent chloroprene contained 1 part of phenothiazine. After 30 hours the germs of ω-polymer began to grow. After 45 hours the distillation column again was rendered inoperable.

*Example 3*

(Method according to the invention)

This experiment was carried out in a distillation apparatus analogous to that described in Example 1. Into the column that was contaminated with three freshly prepared colourless germs of ω-polymer, phenothiazine was introduced in such a quantity that 1000 parts of the refluent chloroprene contained 0.3 part of phenothiazine. 3 to 4 liters of air were introduced into the still of the aforesaid distillation column per 1000 grams of refluent chloroprene. After a few hours already the germs of ω-polymer changed their colour and after 24 hours they had turned brown black. The duration of the distillation was 350 hours. During this period the discoloured germs of ω-polymer did not undergo further alterations. No growth could be observed.

*Example 4*

(Method according to the invention)

In a distillation column that was contaminated with freshly prepared germs of ω-polymer chloroprene was stabilized by introducing phenothiazine in such a quantity that 1000 parts of refluent chloroprene contained 0.5 part phenothiazine, and by simultaneously adding 5 liters of air per 1000 grams of refluent chloroprene. In addition thereto, 90 liters of monovinyl acetylene per 1000 grams of chloroprene were introduced into the still of the aforesaid column. After 20 hours already the germs of ω-polymer had turned brown black. Even after 400 hours they had not grown.

We claim:

1. A process for simultaneously stabilizing chloroprene against α-polymerization and ω-polymerization comprising adding phenothiazine to said chloroprene, and blowing air into the chloroprene-phenothiazine mixture.

2. A process as claimed in claim 1 wherein 1000 parts by weight of chloroprene contain about 0.3 to about 1.0 part by weight of phenothiazine.

3. A process as claimed in claim 1 wherein the phenothiazine that is added is dissolved in an inert solvent.

4. A process as claimed in claim 1 wherein the phenothiazine that is added is dissolved in chloroprene.

5. A process as claimed in claim 1 wherein mixtures of chloroprene and monovinyl acetylene are stabilized.

6. A process as claimed in claim 1 wherein said chloroprene is stabilized during its preparation and purification.

7. A process as claimed in claim 6 wherein said chloroprene is stabilized in the distillation stages of its preparation and purification.

8. A process as claimed in claim 7 wherein about 5% by volume, calculated on the quantities of phenothiazine-containing chloroprene vapours which pass through the distillation stages, of air is used.

9. A process as claimed in claim 7 wherein about 2 to about 15 liters of air are introduced into the stills of the distillation columns per 1000 grams of refluent, phenothiazine containing chloroprene.

10. A process for simultaneously stabilizing chloroprene against $\alpha$-polymerization and $\omega$-polymerization comprising adding phenothiazine to said chloroprene, and blowing molecular oxygen into the chloroprene-phenothiazine mixture.

No references cited.